Feb. 23, 1965   P. R. NOYES   3,170,833
ADHESIVE COMPOSITIONS AND LAMINATES PREPARED THEREFROM
Filed March 2, 1961

FIG. I

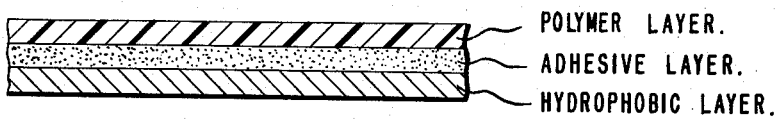

— POLYMER LAYER.
— ADHESIVE LAYER.
— HYDROPHOBIC LAYER.

FIG. II

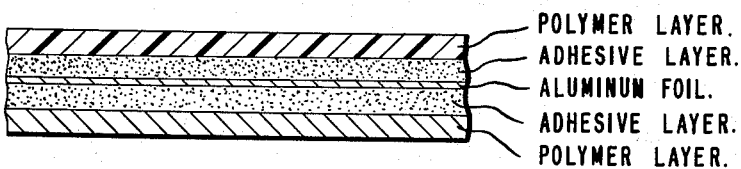

— POLYMER LAYER.
— ADHESIVE LAYER.
— ALUMINUM FOIL.
— ADHESIVE LAYER.
— POLYMER LAYER.

FIG. III

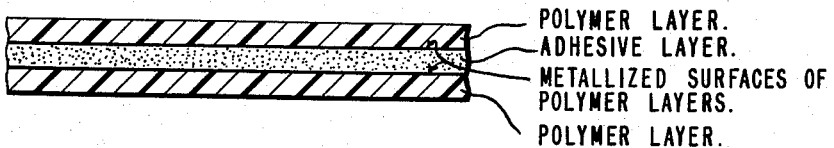

— POLYMER LAYER.
— ADHESIVE LAYER.
— METALLIZED SURFACES OF POLYMER LAYERS.
— POLYMER LAYER.

INVENTOR
PAUL RANDOLPH NOYES

BY  Raymond E. Blomstedt
ATTORNEY

United States Patent Office 3,170,833
Patented Feb. 23, 1965

3,170,833
ADHESIVE COMPOSITIONS AND LAMINATES PREPARED THEREFROM
Paul Randolph Noyes, Wilmington, Del., assignor to E. I. du Pont de Nemours and Company, Wilmington, Del., a corporation of Delaware
Filed Mar. 2, 1961, Ser. No. 92,762
18 Claims. (Cl. 161—186)

This invention relates to terephthalate copolyester adhesive compositions and to improved laminates including at least one surface layer of a condensation polymer made up of units from terephthalic acid and units from an alpha-omega glycol, especially reflective metallic yarn laminates having a layer of reflective metal foil sandwiched adhesively between two of the aforementioned surface layers of the condensation polymer. More particularly, the invention relates to terephthalate copolyester adhesive compositions designed for laminating aluminum foil between two transparent surface layers of "Mylar" polyester film, i.e., a condensation polymer having units from terephthalic acid and units from ethylene glycol, in the preparation of reflective metallic yarn laminates which are characterized by improved resistance to delamination and resistance to metal loss on exposure to dilute aqueous alkali.

Reflective yarns are ordinarily prepared by forming a laminate having two transparent surface layers of terephthalate polyester film, e.g., "Mylar," and a layer of reflective aluminum foil therebetween and bonded to the face layers with an adhesive composition, and slitting the resulting laminate into appropriate yarn widths. This yarn in combination with other thread or yarn is woven into textile yard goods and, in this textile manufacture, is subjected to chemical and physical treatment associated usually with textile processing, usually including exposure to dilute aqueous alkali which ordinarily causes metal loss and delamination.

Condensation polymers, i.e., linear polyesters, having in the linear chain thereof units from terephthalic acid, units from another dicarboxylic acid, e.g., adipic acid, sebacic acid and isophthalic acid, and units from at least one alpha, omega dihydric alcohol are known to be useful in forming laminates which include at least one layer of a pellicle of a condensation polymer made up of units from terephthalic acid and units from a glycol, e.g., "Mylar" polyester film. U.S. Patents 2,623,031; 2,623,033; 2,765,251 and 2,892,747 disclose numerous terephthalate copolyester compositions useful as adhesives for laminating polyethylene terephthalate pellicles prepared by following the teachings of U.S. Patent 2,465,319.

Although these prior art terephthalate polyester adhesives provide laminates having satisfactory adhesive bonds under ordinary environments, metallic yarn laminates having an aluminum reflective layer bonded with simple polyester adhesive composition representative of the aforementioned prior art exhibit undesirable delamination and actual loss of metal, especially aluminum, when the metallic yarn laminate is processed under ordinary alkaline textile processing conditions. Delamination and metal loss deteriorates the usefulness and aesthetic value of the metallic yarn.

FIGURES I, II and III in the drawing illustrate specific embodiments of the laminate of the invention.

A primary objective of this invention is to provide new and useful terephthalate copolyester adhesive compositions, especially compositions which as a cured adhesive layer in laminates having a metallic layer bonded to a pellicle of a linear condensation polymer having units from terephthalic acid and units from an alpha, omega dihydric alcohol establishes a strong adhesive bond which resists delamination and minimizes metal loss under the alkaline conditions of ordinary textile processing. Another important objective is to provide metallic yarn laminates which are characterized by improved resistance to delamination and metal loss. A further objective is to provide a method of preparing reflective metal yarn laminates characterized by improved resistance to delamination and resistance to metal loss on exposure to dilute aqueous alkali.

These and other important objectives hereinafter disclosed are accomplished by forming a mixture of (A) a terephthalate copolyester, (B) a compatible diepoxide having at least two cycloaliphatic rings per molecule including two said cycloaliphatic rings each having an oxirane oxygen atom joined to adjacent carbon atoms of the ring, and at least one member of the group of (C) an adduct of pyromellitic dianhydride and a polyol reacted under conditions which cause two equivalents of hydroxyl substituents thereof to condense with two moles of the pyromellitic dianhydride and (D) an adduct of an organic diisocyanate and an aliphatic polyol composition consisting primarily of a triol, the molar proportion of the diisocyanate being sufficient to provide between more than one and up to two —NCO groups per —OH substituent, these adhesive components being compatibly in solution in a volatile liquid organic solvent therefor. Laminates are prepared by applying the solution of the adhesive components in a suitable solvent therefor to a pellicle of the condensation polymer, i.e., terephthalate polyester film, in a proportion sufficient to deposit a thin dry layer of adhesive on volatile loss of the solvent, drying the applied adhesive coating and laminating a second hydrophobic layer to the adhesive-coated first layer at a temperature sufficient to activate the adhesive. More specifically the reflective metal yarn laminates are prepared by laminating a metal foil, e.g., aluminum foil, to a pellicle of terephthalate polyester film having a dry coating of the adhesive composition on one surface thereof under activating conditions and laminating the exposed metal surface of the resulting laminate to a second pellicle of terephthalate polyester film having a dry coating of the adhesive composition on one surface thereof, and thereafter curing the laminate at an elevated temperature sufficient to enhance the resistance characteristics of the resulting reflective laminate. The curing can be accomplished either before or after the pellicular reflective laminate is slit into appropriate yarn widths. A second method of preparing the reflective metal laminates is to initiate with metallized terephthalate polyester film having a molecularly thin reflective layer of metal applied to one surface thereof by vapor deposition and to laminate the metallized face of one such pellicle to the metallized face of a second such pellicle by means of the adhesive applied to one or both of the metallized surfaces and thereafter curing the adhesive layer of the resulting laminate. Curing of the laminates by post-heating effects crosslinking of the adhesive components and thereby provides the laminate with resistance to alkali.

Crosslinking by post-heating is ordinarily accomplished at a temperature in the range of about 250° F. to 350° F. preferably at 275° F. to 325° F. for commercial operations. Caustic resistance tends to deteriorate when crosslinking is effected at a curing temperature significantly below 275° F. Undesirable shrinkage of the terephthalate polyester film presents a problem when the post-heating of rolls of the laminate is effected at a temperature significantly above 325° F.

The period of post-heating for effective curing sufficient to provide caustic resistance can be as short as ten seconds when the laminate is in the form of a single sheet and may range up to 24 hours and longer when the laminate is in bulky form, e.g., a roll of film of commercial size. Curing of the rolls of the laminate for 8 to 16 hours at 275° F. to 325° F. is the usual practice in commercial operations.

The composition of the terephthalate copolyester component of the adhesive composition can be varied widely with the provision that the proportion of units from terephthalic acid is at least 25 mol percent based on the total units of dicarboxylic acid making up the copolyester. From 40 to 90 mol percent of the total units of dicarboxylic acid making up the copolyester are usually aromatic dicarboxylic acids, especially the benzenedicarboxylic acids, e.g., terephthalic acid and isophthalic acid, the content of terephthalic units ordinarily not exceeding about 85 mol percent. The dicarboxylic units may be entirely aromatic, e.g., as high as 85 mol percent terephthalic in combination with 15 mol percent isophthalic units. The aromatic dicarboxylic units preferably include 35 to 65 mol percent of units from terephthalic acid. Higher proportions of terephthalic units tend to cause solubility problems and the copolyester tends to exhibit greater crystallinity in comparison with preferred amorphous characteristics.

Usually at least 10 mol percent, preferably 20 to 50 mol percent, of the dicarboxylic acid units making up the copolyester are from one of more saturated aliphatic dicarboxylic acids having at least four carbon atoms, preferably four to eight, in the linear chain of atoms joining the two carboxyl substituents.

Typical useful aliphatic dicarboxylic acids include: adipic, pimelic, suberic, azelaic, sebacic, 2-ethyl suberic, 2,5-diethyl adipic, undecanedioic, dodecanedioic, tridecanedioic, 4-propyl suberic, 2-methyl-5-ethyl suberic, 6,6-dimethylundecane-1,11-dioic, cyclohexane-1,4 - dicarboxylic, oxydibutyric, oxy-dicaproic, 5-oxa-1,10-decanedioic, 5,8 - dioxa - 1,13 - tridecanedioic and 3,6,9-trioxa-1,11 - undecanedioic. Useful aromatic dicarboxylic acids include terephthalic, isophthalic, bibenzoic, tetramethylene bis-p-oxybenzoic, ethylene-bis-p-oxybenzoic and 2,6-naphthalic. Orthophthalic acid can be used in minor proportions in combination with one or more of the aforementioned aromatic dicarboxylic acids having the carboxyl substituents joined to non-adjacent carbon atoms of the aromatic ring. While the units from the aliphatic dicarboxylic acid can be of a single species, it is advantageous for these units to represent a plurality of species, e.g., a combination of sebacic and adipic acids or a mixture of isomers such as the commercially available "Isosebacic" acid consisting essentially of $C_{10}$ isomers including 50 to 80 parts of 2-ethyl suberic acid, 10 to 20 parts of 2,5-diethyl adipic acid and up to 40 parts of sebacic acid. U.S. Patent 2,892,747 discloses the preparation of terephthalate copolyesters having a plurality of species of units from aromatic dicarboxylic acids and a plurality of species of units from aliphatic dicarboxylic acids which are particularly useful as the copolyester component of the adhesive compositions of this invention.

The dihydric materials which provide the units which link the units from the dicarboxylic acids in the copolyester are preferably alpha, omega saturated aliphatic diols, i.e., glycols and preferably glycols having a hydrocarbon chain of 2 to 10 carbon atoms in the linearity thereof joining the two hydroxyl substituents. The divalent radical joining the hydroxyl substituents can have extra-linear alkyl substitutents, e.g, methyl, ethyl, propyl, isopropyl, butyl, the total number of carbon atoms in the extra-linear substituents being preferably no more than four. The joining divalent radical of the diol can include one or more ether oxygen atoms in the linearity thereof, at least two carbons separating any ether oxygen atom from another oxygen atom in the diol. Ethlyene glycol is particularly preferred as the diol and preferred useful diol mixtures ordinarily include at least 75 mol percent of ethylene glycol. Useful diols include polymethylene glycols having the general formula $$HO(CH_2)_nOH$$

where $n$ in an integer preferably from 2 to 10, e.g., ethylene glycol, propanediol-1,3, tetramethylene glycol, pentanediol-1,5, hexanediol-1,6, octamethylene glycol, decanediol-1,10; cyclohexanediol-1,4, propylene glycol, diethylene glycol, triethylene glycol, tetraethylene glycol, dipropylene glycol, butanediol-1,2, butanediol-1,3 and 2,2-dimethyl propanediol-1,3.

The terephthalate copolyesters are prepared from the aforementioned reactants following the general esterification and condensation techniques described in U.S. Patents 2,623,031; 2,623,033; 2,765,250; 2,765,251 and 2,892,747. The usual practice is to initially prepare the monometric bishydroxy ester of the respective dicarboxylic acids and the diol. Thereafter a mixture having appropriate proportions of these bis-hydroxy esters is condensed to form the copolyester with removal of excess diol, the condensation being continued until the desired inherent viscosity is attained. The inherent viscosity at 25° C. is usually in the range of 0.4 to 1.5, preferably from 0.5 to 1, based on a solution of 0.6 gram of the copolyester in 100 millimeters of m-cresol. The inherent viscosity is calculated from the equation:

$$\text{Inherent viscosity} = \frac{\log_e V_R}{C}$$

where $V_R$ is the relative viscosity of the solution of copolyester in m-cresol, i.e., the ratio of the viscosity of the 0.6 gram solution of copolyester relative to the viscosity of the m-cresol solvent, $C$ being the 0.6 gram concentration of copolyester in the indicated solution. The above equation converted to the basis of common logarithms $\log_{10}$ becomes:

$$\text{Inherent viscosity} = 3.838 \log_{10} V_R$$

The monomeric bis-hydroxy esters are prepared preferably by ester-interchange between the diol or glycol and the bis-ester of the dicarboxylic acid, especially the aromatic acids, and a readily volatile alkanol, e.g., methanol, ethanol or butanol. With most of the aliphatic dicarboxylic acids, it is usually convenient to directly esterify with the diol to produce the monomeric bis-ester.

The composition of the solvent useful for dissolving the copolyester will vary with the composition of the copolyester. Copolyesters rich in terephthalic units require stronger solvents, i.e., more polar solvents. Solvents and mixtures of solvents are so selected that practical viscosities are attained at practical concentrations of the copolyester. A desirable criterion is a solution having a concentration of 20% of the copolyester and having a viscosity up to about 150 centipoises at 25° C. Solutions may have a copolyester concentration of 25% or even higher in meeting this viscosity criterion. Useful solutions can contain as little as 5% of the copolyester, the preferred concentration being in the range of 10% to 25%.

Useful volatile organic solvents include 1,1,2-trichloroethane, chloroform, methylene chloride, dioxane, tetrahydrofuran, tetrachloroethane, mixtures of these solvents with ketones, e.g., cyclohexanone, methyl ethyl ketone, methyl isobutyl ketone, diacetone alcohol and mixtures of these solvents with aromatic hydrocarbons, e.g., toluol, xylol, and benzol. Typical useful mixtures of solvents are: one part of dioxane with up to about two parts of toluol, and one part of dioxane with up to four parts of methyl ethyl ketone.

The second essential component of the adhesive combination is a diepoxide characterized by two epoxy groups each having an oxirane oxygen atom joined to adjacent carbon atoms. Preferably each oxirane oxygen atom is joined to adjacent ring carbons of a cycloaliphatic ring, each ring having only one oxirane oxygen joined thereto and the respective rings being joined through a carboxylate linkage. Diepoxides of this class are described in U.S. Patents 2,890,194; 2,890,195; 2,890,196 and 2,890,197 as having the general formula

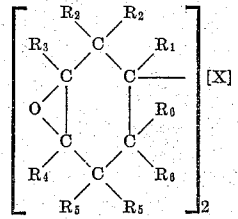

where [X] is the linking divalent radical having carboxylate functionality from the group consisting of (a)

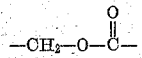

(b)

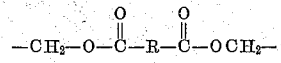

and (c)

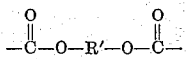

wherein —R— represents a divalent $C_2$ to $C_{12}$ hydrocarbon radical which may be aliphatic or aromatic, —R'— represents a divalent lower aliphatic hydrocarbon radical or a divalent lower oxyalkylene group, and monovalent radicals $R_1$— through $R_6$— represent H— or a lower alkyl group, such as $CH_3$—, $C_2H_5$—, $C_3H_7$— and $C_4H_9$—.

The diepoxides having the linking carboxylate radical (a)

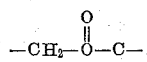

are preferred. These are more specifically identified as 3,4 - epoxycyclohexylmethyl 3,4 - epoxycyclohexanecarboxylates. The 3,4-epoxy-6-methylcyclohexylmethyl 3,4-epoxy,6-methylcyclohexanecarboxylate is commercially available as Epoxide 201 from Union Carbide Corporation.

Proportions of up to 70 parts of the diepoxide (B) per 100 parts by weight of the terephthalate copolyester (A) contribute desirable improvements in adhesive properties of the combination, a proportion of at least 2 parts being required ordinarily to provide an effective contribution. For laminates where alkali resistance is important, the proportion of the diepoxide preferably is in the range of 5 to 30 parts on the indicated basis.

Crosslinking of the adhesive components (A) and (B) is effected by the presence of at least one of the reactive polyfunctional components (C) and (D). Particularly preferred adhesive compositions which cure by crosslinking to optimum resistance to caustic include both the pyromellitic dianhydride-adduct (C) and the polyisocyanate adduct (D) as curing agents.

The pyromellitic dianhydride/polyol adduct (C), for convenience throughout the specification, is referred to as PMDA-adduct. These adducts are products of condensing pyromellitic dianhydride (PMDA) with a polyol, preferably a diol, under conditions whereby two moles of the dianhydride are condensed with one mole of the polyol. The hydroxyl substituents react with a single anhydride group on each of two PMDA molecules in a manner whereby the residue of the polyol forms a bridge between carboxyl substituents attached to the aromatic nuclei of the two PMDA molecules. The structure of these adducts may be represented generically as follows:

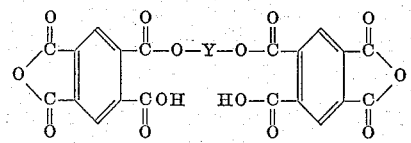

In this structure, —Y— represents the divalent nucleus of the polyol with which the two molecules of PMDA were condensed. This nucleus —R— can be either aliphatic, cycloaliphatic, aromatic, mixed alkaryl, or the like. Typical polyols which can be used to supply the nucleaus —Y— include:

Aliphatic glycols, e.g.,
  1,4-butanediol,
  Ethylene glycol,
  Neopentyl glycol,
  1,6-hexanediol;
Cyclic glycols;
Ether glycols, e.g.,
  Diethylene glycol,
  Polyoxyethylene glycol,
  Polyoxypropylene glycol,
  Polyoxytetramethylene glycol;
Aliphatic triols, e.g.,
  Glycerol,
  1,2,6-hexanetriol,
  1,2,4-butanetriol;

and other compounds which in addition to a pair of hydroxyl substituents have ether oxygen atoms, carboxyl or carboxylate groups, nitro groups, sulfonate radicals, etc. Especially useful in the practice of this invention are PMDA-adducts of hydroxyalkoxyaryl structures having the general formula:

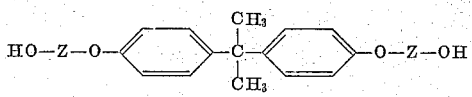

where —Z— is a divalent saturated aliphatic hydrocarbon radical, e.g., diphenylol propane etherified with a glycol such as ethylene glycol or propylene glycol. Dihydroxy compounds of this type are commercially available, e.g., 2,2-bis[4-(2-hydroxyethanoxy)phenyl]propane is available as Dow Resin X–2635 and 2,2-bis[4-(2-hydroxypropanoxy)phenyl]propane is available as Dow Resin 565.

PMDA-adducts of the class described are disclosed and claimed in copending application T. J. Hyde, Serial No. 840,251, filed September 16, 1959, Example 1 thereof being specific to the PMDA-adduct of Dow Resin X–2635.

The general technique for preparing the PMDA-adducts involves condensing PMDA in the proportions of about two moles per mole of the polyol in an organic solvent usually at reflux temperature under a blanket of dry nitrogen. A basic or acidic condensation catalyst may be present, but it is not essential.

A wide variety of organic solvents can be used as the reaction medium solvent, the solvent preferably being a ketone, e.g., acetone, methyl ethyl ketone, methyl isobutyl ketone, and cyclohexanone. The primary solvent can be diluted if desired with an aromatic hydrocarbon, e.g., benzol, toluol or xylol. Preferred solvents and solvent/diluent combinations are those in which the adduct is substantially soluble and non-reactive therewith and which are compatible with the solutions of the remaining components of the adhesive composition.

Proportions of the PMDA-adduct in the adhesive combination can range up to 10 parts per 100 parts of the terephthalate copolyester, at least 0.5 part on the indicated basis being required usually to provide an effective contribution. Preferred proportions are in the range of 1 to 5 parts. Proportions significantly above 5 parts tend to result in a decrease in caustic resistance in comparison with the preferred range.

Where a high degree of alkali resistance is not essential in the laminates, the polyisocyanate adduct (D) can be used advantageously in place of the curing agent (C) to effect crosslinking between the adhesive components (A) and (B). Crosslinking induced by component (D) provides significantly higher bond strengths than are obtained ordinarily with adhesive component (A) alone or with the defined adhesive combination of components (A) and (B).

The polyisocyanate adduct (D) is a prepolymer resulting from condensation of an organic diisocyanate and a triol, mixed triols or mixtures of one or more triols with one or more diols. The diisocyanate is used in such proportions that the adduct contains a plurality of isocyanate substituents, i.e., the ratio on a molar basis of the isocyanate groups per hydroxyl substituent is in the range of greater than one and up to two, preferably in the range of about 1.33 to about 1.83. Suitable polyisocyanate adducts are disclosed and claimed in U.S. Patent 2,855,421. Useful organic diisocyanates include toluylene diisocyanates, tetramethylene diisocyanate, hexamethylene diisocyanate and 4,4'-diphenylmethane diisocyanate, the toluylene diisocyanates being preferred. Polyols useful for condensation with the diisocyanate include trimethylolpropane, trimethylolethane, glycerol, 1,2,4-trihydroxybutane, triethanolamine, ethylene glycol, propanediol-1,3, butanediol-1,4, hexanediol, methyl-hexanediol, diethyleneglycol, and mixtures thereof. In mixtures of triols and diols, the content of triol is preferably at least 50% by weight of the mixture. The adduct of about 5 moles of toluylenediisocyanate and 2 moles of trimethylol propane is especially preferred.

The proportion of the polyisocyanate adduct can be up to about 25 parts per 100 parts by weight of the terephthalate copolyester, the preferred proportion being in the range of 5 to 15 parts. Ordinarily a proportion of at least 2 parts is required to provide an effective contribution.

In addition to the aforementioned essential components, the adhesive composition may contain various ancillary materials which are compatible therewith. For example, the adhesive composition may contain plasticizers for the purpose of altering the flexibility characteristics of the cured adhesive without significant alteration of the composition and relative proportions of the essential components. Phthalate esters, e.g., dibutyl phthalate and di-2-ethylhexylphthalate; phosphate esters, e.g., tri-cresylphosphate, and mixed ester plasticizers, e.g., butylphthalyl butyl glycolate, commercially available as "Santicizer" B–16, polyalkylene glycols, e.g., polyethylene glycols and polytetramethylene glycols, are representative useful plasticizers. Ordinarily the proportion of the ancillary plasticizer ranges up to about 20 parts per 100 parts of the terephthalate copolyester component (A). When higher proportions are required, it is usually more advantageous to alter the composition of the terephthalate copolyester or alter the relative proportions of the essential components.

Pigments, dyes, and other substantially durable coloring matter may be included in the adhesive compositions to provide color variations. The pigments preferably are transparent or are used at proportions which are low hiding when the pigment is included in the adhesive layer of the reflective foil laminates. If desired, the colored adhesive composition can be used as a surface coating.

The following examples are provided to illustrate the principles and practice of this invention, but its scope is not limited to the exact details of these illustrative examples. Unless otherwise indicated, the parts and percentages are given by weight.

EXAMPLE 1

| | Parts by weight |
|---|---|
| First Portion: | |
| Terephthalate Copolyester A | 100 |
| Dioxane | 150 |
| Cyclohexanone | 10 |
| Toluol | 240 |
| Diepoxide, Epoxide 201 | 10 |
| Second Portion: | |
| Solution of PMDA-adduct, 55% in methyl ethyl ketone | 4.5 |
| Solution of polyisocyanate-adduct, 60% in methyl isobutyl ketone | 21 |
| | 535.5 |

Terephthalate Copolyester A is made up of units from ethylene glycol and mixed dicarboxylic component units in the following indicated molar percentages: terephthalic 40, isophthalic 40, adipic 10 and sebacic 10. The preparation of this copolyester follows the teachings of U.S. Patent 2,892,747, more specifically Example 1 thereof. Condensation of the mixture of the monomeric bishydroxyethyl esters of the respective dicarboxylic acids is continued until the resulting copolyester is characterized by a relative viscosity of about 1.5 based on a solution of 0.6 gram of the copolyester in m-cresol. The diepoxide, Epoxide 201, is 3,4-epoxy,6-methylcyclohexylmethyl 3,4-epoxy,6-methylcyclohexane carboxylate. The copolyester and the diepoxide are dissolved in the indicated solvent mixture to form a compatible solution designated as the First Portion. The components of the Second Portion are added thereto and the combined portions are mixed until uniform in composition. The PMDA-adduct is the condensation product of two moles of pyromellitic dianhydride (PMDA) and one mole of Dow Resin X–2635, i.e., 2,2-bis[4-(2-hydroxyethanoxy)phenyl]propane, in the presence of methyl ethyl ketone at reflux temperature. The polyisocyanate-adduct is the product of condensing 5 moles of toluylene diisocyanate, e.g., "Hylene" TM, with 2 moles of trimethylolpropane in the presence of methyl isobutyl ketone, the resulting solution of the adduct being at 60% concentration and having about 8.3 to 8.9% of reactive non-condensed isocyanate groups.

The resulting adhesive composition has a non-volatile content of about 25%, the adhesive components thereof being in the following proportions:

| | |
|---|---|
| Terephthalate Copolyester A | 100 |
| Diepoxide | 10 |
| PMDA-adduct | 2.5 |
| Polyisocyanate-adduct | 12.5 |

This adhesive is coated on one side of 0.5 mil "Mylar" polyester film, i.e., a transparent pellicle of condensation polymer made up of units from terephthalic acid and units from ethylene glycol. The adhesive coating is applied at a thickness of 0.3 mil. The adhesive coating is dried by volatile loss of the solvent therefrom. The adhesive-coated pellicle is cut into portions and using one portion as a first surface layer, a layer of aluminum foil is laminated to the adhesive surface of the first layer. A second portion of the adhesive-coated polyester pellicle as a second surface layer is laminated to the exposed aluminum surface of the "Mylar"/foil laminate, the adhesive surface of the second pellicle being in contact with the metal foil surface.

In the laminator, the applied adhesive is dried by passage through a tunnel kept at about 180° to 210° F. The assembly is passed through a nip roll having a temperature of about 345° F., the passage being at a rate of about 35 feet per minute.

Specimens of the resulting laminate are post-cured at a temperature of about 345° F. for periods ranging up to 300 seconds in a Carver press at about 5,000 pounds per square inch pressure, and after aging for 24 hours at room temperature, i.e., at about 77° F., the respective laminate specimens are slit into yarn strands having a width of about 1/64 of an inch. The strands are exposed to an aqueous 1.5% caustic solution at 130° F. for about 45 minutes. Thereafter the treated strands are rinsed free of caustic and rated for metal loss and extent of delamination.

The following Table 1 records the effect of post-curing.

*Table 1*

| Post-Curing Time | Percent Metal Loss | Percent Delamination |
|---|---|---|
| 0 | 100 | |
| 10 | 35 | 40 |
| 30 | 25 | 20 |
| 60 | 20 | 10 |
| 300 | 15 | Less than 5 |

A comparative laminate is prepared in identical manner using Terephthalate Copolyester A as the adhesive, i.e., the First Portion of Example 1 minus the diepoxide. This laminate exhibits 100% metal loss and gross delamination after exposure to the caustic treatment.

A second comparative laminate is prepared in identical manner using the combination of the Terephthalate Copolyester A and the diepoxide as the adhesive, i.e., the First Portion of Example 1, the curing agents of the Second Portion being absent. This laminate exhibits no significant improvement in caustic resistance over the laminate prepared with the terephthalate copolyester as the adhesive, i.e., crosslinking of adhesive components (A) and (B) with at least one of the curing agents (C) and (D) and heat-curing to effect the cross-linking is necessary to provide a significant improvement in caustic resistance.

EXAMPLES 1a, 1b, 1c, 1d

The essential components of these adhesive compositions are identical with those of Example 1, these components being in the following proportions:

| | Examples | | | |
|---|---|---|---|---|
| | 1a | 1b | 1c | 1d |
| Terephthalate Copolyester A | 100 | 100 | 100 | 100 |
| Diepoxide | 8.8 | 8.6 | 8.6 | 8.5 |
| PMDA-adduct | 1.0 | 1.7 | 3.1 | 3.6 |
| Polyisocyanate-adduct | 11.3 | 11.3 | 12.4 | 8.5 |

The solvent combination in these adhesive compositions is the same as shown in Example 1.

"Mylar" polyester film/aluminum foil/"Mylar" laminates are prepared in the same manner as described above, using the compositions of Examples 1 through 1d as the respective adhesives. The respective specimen assemblies are pressed in a Carver press at about 75 pounds per square inch for 30 seconds at 345° F. After curing, the specimen laminates are slit into strands 1/64 of an inch in width. Specimen strands are aged respectively for two days at room temperature and four weeks at an oven temperature of 140° F. Thereafter the aged strands are given the caustic treatment and then evaluated for metal loss. The strands aged two days at room temperature exhibit metal loss of about 20% except the strands using the Example 1d adhesive which exhibits metal loss approaching 30%. Further increase in the content of the PMDA-adduct above that specified in Example 1d causes a proportionately greater metal loss. Where caustic resistance of the laminate is not essential, up to 10 parts of the PMDA-adduct provides an advantageous contribution, but where improved caustic resistance of the metallic laminate and metallic prepared therefrom is desirable, the proportion of the PMDA-adduct preferably does not exceed 5 parts per 100 parts of the Terephthalate Copolyester A. With the specimen strands aged four weeks at 140° F., the Example 1, 1b and 1c strands exhibit about 20% metal loss, the same as the specimens aged at room temperature. Laminate strands of Example 1a exhibit about 25% metal loss and the laminate strands of Example 1d exhibit about 35% metal loss.

Another series of laminates is prepared initiating with "Mylar" polyester film which is metallized on one surface with aluminum applied by vapor deposition, using the respective adhesives of Examples 1 through 1d as the adhesive layer between the metallized faces of two surface layers of the polyester film which is a condensation polymer having units from ethylene glycol and units from terephthalic acid. Copolyester A is used similarly as the adhesive layer in a comparative laminate. The respective laminates are press-cured for 30 seconds as heretofore described, and after room temperature aging, are slit in yarn width and subjected to the caustic treatment. The comparative laminate strands exhibit extensive delamination and about 100% metal loss. The laminate strands having the cured crosslinked adhesive layer from the respective Examples 1 through 1d compositions, exhibit significant improvement over the comparative laminate in reference to resistance to delamination and resistance to metal loss. In this type of laminate assembly the resistance to metal loss is not great as in the laminate assembly previously described having the aluminum foil sandwiched between two surface layers of the polyester film with layers of the cured adhesive therebetween.

EXAMPLE 2

First Portion:   Parts by weight
  Terephthalate Copolyester B _____ 100
  1,1,2-trichloroethane _____ 580
  Diepoxide Epoxide 201 _____ 13
Second Portion:
  PMDA-adduct, 55% solution _____ 4.7
  Polyisocyanate-adduct, 60% solution _____ 21.3

719.0

Copolyester B is made up of units from ethylene glycol and a mixture of dicarboxylic component units in the proportions of 55 moles terephthalic and 45 moles sebacic. This copolyester is condensed until it is characterized by a relative viscosity in the range of 1.5 to 1.6. The diepoxide, the PMDA-adduct and the polyisocyanate-adduct are the same as specified in Example 1. The resulting adhesive composition has a non-volatile content of about 18%, the essential components thereof being in the following proportions:

Parts by weight
Terephthalate Copolyester B _____ 100
Diepoxide _____ 13
PMDA-adduct _____ 2.6
Polyisocyanate-adduct _____ 12.8

A "Mylar"/aluminum foil/"Mylar" polyester film laminate is prepared as described in Example 1 under the laminating conditions as follows: drier temperature—250° F., speed—25 feet per minute and roll temperature—343° F. Specimens of the resulting laminate are press-cured for various periods of time in a Carver press as described in Example 1, aged respectively at room temperature and at 140° F. and thereafter slit and subjected to the caustic treatment. Table 2 records the evaluation of metal loss for these specimens.

Table 2

| Press-Curing Time, Seconds | Percent Metal Loss | |
|---|---|---|
| | 24-Hour Aging at Room Temperature | 2 Weeks' Aging at 140° F. |
| 0 | 100 | |
| 5 | 35 | 10 |
| 15 | 20 | 15 |
| 30 | 20 | 15 |
| 60 | 20 | 15 |
| 300 | 20 | 10 |

Resistance to delamination increases with the curing time and correlates with the metal loss.

EXAMPLE 3

First Portion: Parts by weight
   Terephthalate Copolyester A _____ 100
   Dioxane _____ 150
   Cyclohexanone _____ 10
   Toluol _____ 240
   Polyisocyanate-adduct _____ 11
Second Portion:
   Diepoxide, Epoxide 201 _____ 3.5
                                               514.5

The indicated components are the same as specified in Example 1. This composition does not include the PMDA-adduct.

Examples 3a, 3b and 3c are essentially the same formulation except for increasing the diepoxide content to 6 parts, 9.7 parts and 13.5 parts respectively. "Mylar"/aluminum foil/"Mylar" polyester film laminates are prepared using these respective adhesive compositions. Two comparative laminates are similarly prepared using the First Portion of Example 3 and Terephthalate Copolyester A as the respective adhesive compositions. The resulting laminates are press-cured for 30 seconds, slit into strands, aged, and subjected to caustic treatment as heretofore described. Results of evaluation of metal loss are recorded in Table 3.

Table 3

| | Percent Metal Loss | |
|---|---|---|
| | 2 Days' Aging at Room Temperature | 4 Weeks' Aging at 140° F. |
| Comparative Copolyester/Diepoxide Laminate | 50 | 50 |
| Comparative Terephthalate Copolyester A Laminate | 100 | 100 |
| Example 3 Laminate | 30 | 30 |
| Example 3a Laminate | 25 | 35 |
| Example 3b Laminate | 20 | 25 |
| Example 3c Laminate | 45 | 50 |

In another series of tests, 0.5 mil "Mylar" polyester film is laminated together using the respective adhesives of Examples 3 through 3c as the adhesive layer and press-cured as indicated. Peel strengths of the resulting laminates are determined at 77° F. and at 200° F. The peel strengths at 77° F. are in the range of 0.7 to 1.1 pounds per inch and at 200° F. in the range of 1.6 to 3.4. Comparative laminates prepared using Terephthalate Copolyester A as the adhesive register 0.9 pound at 77° F. versus 0.8 pound at 200° F. Other comparative laminates having adhesive layers respectively composed of the Copolyester A and the diepoxide in proportions ranging from 10 to 70 parts of the diepoxide per 100 parts of the copolyester, no crosslinking agent being present, show a significant decrease in peel strength at 200° F. in comparison with the peel strength at 77° F. However, the peel strength of these laminates at 77° F. is significantly improved in comparison with the Copolyester A laminates as a result of the presence of the diepoxide. Presence of the curing agent, preferably the polyisocyanate-adduct, in combination with the copolyester and the diepoxide is necessary to enhance the peel strength at an elevated temperature, e.g., at 200° F. This improvement is desirable particularly for sealing terephthalate polyester film envelopes which may be immersed in hot water which may approach the boiling temperature.

Addition of 0.5 to 3 parts of the PMDA-adduct to the adhesive compositions of Examples 3 through 3c also enhances the peel strength at 200° F. versus the peel strength at 77° F., the optimum differential in peel strength in reference to the proportion of PMDA-adduct being in the range of 1 to 2 parts thereof per 100 parts of the copolyester. The advantageous differential in peel strength diminishes at higher proportions of the PMDA-adduct.

EXAMPLE 4

First Portion: Parts by weight
   Terephthalate Copolyester B _____ 100
   1,1,2-trichloroethane _____ 580
   Diepoxide, Epoxide 201 _____ 13
   PMDA-adduct, 55% solution _____ 4.7
   Polyisocyanate-adduct, 60% solution _____ 23.0
Second Portion:
   Plasticizer, butylphthalyl butylglycolate, "Santicizer" B-16 _____ 3.3
                                              724.0

In this adhesive composition, the essential adhesive components are the same as in Example 2 and these components are in the following proportion:

| | Parts |
|---|---|
| Terephthalate Copolyester B | 100 |
| Diepoxide | 13 |
| PMDA-adduct | 2.6 |
| Polyisocyanate-adduct | 13.8 |
| Plasticizer | 3.3 |

Terephthalate polyester film/aluminum foil/terephthalate polyester film laminates are prepared with this composition as the adhesive layer and crosslinked by press-curing for 30 seconds at 345° F. and characterized by a metal loss of about 20% after the cured laminate has aged five weeks at 140° F.

When the plasticizer is omitted from the composition, i.e., the adhesive composition is the first portion of Example 4, the laminate similarly prepared and cured is likewise characterized by 20% metal loss during caustic treatment after aging five weeks at 140° F. When the proportion of the "Santicizer" B-16 is increased to 7.5 parts in the Example 4 adhesive composition, the resulting cured laminate is characterized by a metal loss of about 25%, indicating that a significant proportion of this ancillary plasticizer can be included in the adhesive composition without detrimental effect on the caustic resistance.

When polypropylene glycol having a molecular weight of about 1200 is substituted for the "Santicizer" B-16, similar results are achieved for caustic resistance of yarn strands of the resulting cured laminate, the metal loss being about 15% when the polypropylene glycol is in the respective proportions of 3.3 and 7.5 parts in the Example 4 type adhesive composition.

*Example 5*

First portion: Parts by weight
   Terephthalate Copolyester C _____ 100
   Methyl ethyl ketone _____ 233
   Polyisocyanate-adduct, 60% solution _____ 16
Second portion:
   Diepoxide, Epoxide 201 _____ 26
                                              375

Copolyester C is a condensation polymer made up of units from ethylene glycol and mixed dicarboxylic component units in the proportion of 33 mol percent terephthalic, 17 mol percent isophathalic and 50 mol percent sebacic. This copolyester has a relative viscosity of about 1.55. The polyisocyanate-adduct and the diepoxide are the same as used in Example 1. The essential adhesive components are in the following proportion:

| | Parts |
|---|---|
| Terephthalate Copolyester C | 100 |
| Polyisocyanate-adduct | 9.6 |
| Diepoxide | 26 |

Specimen laminates are prepared by laminating together the metal side of two pellicles of metallized "Mylar" polyester film using the above composition as the adhesive layer as described in Example 1 and press-cured for 30 seconds, aged and then subjected to caustic treatment. After two weeks' aging at 140° F., the laminate is characterized by metal loss of about 45% and by peel strength of about 2.3 pounds per inch at 77° F. A comparative laminate prepared with the first portion of Example 5 as the adhesive is characterized by metal loss of about 55% and peel strength of about 1.7 pounds at 77° F.

When the proportion of the diepoxide in the Example 5 composition is reduced to 15 parts, the resulting cured laminate is characterized by the same 45% metal loss, but the peel strength is only 1.8 pounds at 77° F.

| | Examples | | |
|---|---|---|---|
| | 6 | 6a | 6b |
| Terephthalate Copolyester D | 100 | 100 | 100 |
| Dioxane | 568 | 568 | 568 |
| Polyisocyanate-adduct—60% Solution | 22 | 22 | 22 |
| Diepoxide | 6.6 | 6.6 | 15.4 |
| PMDA-adduct—55% Solution | | 1.8 | 1.4 |
| | 696.6 | 698.4 | 706.8 |

Copolyester D is a condensation polymer made up of units from ethylene glycol and mixed dicarboxylic component units in the proportions of 55 mol percent terephthalic and 45 mol percent of isosebacic acids which is a mixture of $C_{10}$ saturated aliphatic dicarboxylic acids as heretofore described consisting essentially of 2-ethyl suberic acid, 2,5-diethyl adipic acid, and sebacic acid. The condensation is carried out to a relative viscosity of about 1.6. Cured and aged aluminum foil laminates, prepared as described in Example 1 using these respective adhesive compositions as the bonding layers, are characterized by metal loss of about 20% for Example 6 and about 15% for both Examples 6a and 6b when subjected to the caustic treatment after aging for eight weeks at 140° F.

While the terephthalate copolyesters specified in the examples have the diol component units thereof from ethylene glycol, the following copolyesters substituted wholly or in part for the copolyesters in the examples provide desirable improvements in the cured laminates in reference to resistance to aqueous caustic and resistance to delamination: Terephthalate Copolyester E having the diol component units made up of 99 mol percent ethylene glycol and 1 mol percent of polyethylene glycol "Carbowax" 1000 and the dicarboxylic component units are made up of 55 mol percent terephathalic, 25 mol percent isophthalic and 20 mol percent of the $C_{10}$ isosebacic isomers, the copolyester having an inherent viscosity of 0.47; Terephthalate Copolyester F having a composition the same as that of Copolyester E except that the "Carbowax" 1000 is replaced with polytetramethylene glycol having a molecular weight of about 1000, the copolyester having an inherent viscosity of about 0.63; Terephthalate Copolyester G having the diol component units made up of 85 mol percent ethylene glycol and 15 mol percent of polyethylene glycol, molecular weight 400, and the dicarboxylic component units being made up of 83 mol percent terephthalic and 17 mol percent isophthalic units, the condensation polymer having an inherent viscosity of about 0.70.

While the examples, for convenience of experimental operations, show crosslinking of the adhesive by postcuring the specimen laminates in a heated press, where pressures may range up to thousands of pounds, press-curing is not practical ordinarily for commercial laminating operations on a production line. The foregoing example adhesive compositions evaluated on a continuous laminator having a rewind roll are conveniently post-cured in roll form by holding the rolls of laminate in a heated storage in the temperature range of about 250° F. to 350° F., the length of exposure to this temperature being determined by the heat transfer from the roll surface to the core. While 30 seconds at 350° F. ordinarily provides adequate cure in a single assembly of the laminate, a much longer time is required for the heat to transfer through the convolutions of the ordinary roll. An 8-hour period or overnight storage at the indicated temperature range, preferably in the range of 275° F. to 325° F., provides adequate crosslinking to accomplish the desired improvements and where a continuous single web of the laminate can be conveniently exposed to curing temperatures, adequate crosslinking can be accomplished in 30 seconds and in some instances in even a shorter period. Post-curing in commercial operations is conveniently accomplished after the laminate is slit into yarn widths and rewound on a yarn spindle.

While any significant reduction in metal loss and delamination of the laminate on exposure to aqueous caustic constitutes an improvement, laminates prepared with the adhesives of this invention are usually characterized by metal loss not greater than 50%, and in most instances not greater than 30%. Laminates from the particularly preferred adhesives exhibit metal loss ranging up to about 20%.

I claim:

1. An adhesive composition comprising as essential components thereof: (A) a hydroxyl-terminated terephthalate copolyester, (B) a diepoxide having two cyclohexyl rings joined by a divalent linking radical having carboxylate functionality, each said cyclohexyl ring having a single oxirane oxygen atom joined to adjacent carbon atoms in the ring, and at least one member adduct selected from the group consisting of (C) a carboxylic adduct of pyromellitic dianhydride and a polyol characterized by two to three hydroxyl substituents including two primary hydroxyl substituents per molecule and as being free of non-benzenoid carbon-to-carbon unsaturation, each said primary hydroxyl substituent thereof being condensed with one mole of said dianhydride, and (D) a polyisocyanate adduct of an organic diisocyanate and an aliphatic polyol composition consisting essentially of an aliphatic triol composed of carbon, hydrogen and oxygen atoms and having two to three primary hydroxyl substituents per molecule, the proportion of said diisocyanate component of said polyisocyanate adduct being sufficient to provide isocyanate groups in molar excess over the hydroxyl substituents of said polyol composition up to a ratio of two isocyanate groups per hydroxyl substituent, the proportion of said (C) pyromellitic adduct being 0.5–10 parts when said (D) adduct is absent and said (D) polyisocyanate adduct being 2–25 parts when said (C) adduct is absent, said parts being per 100 parts by weight of said (A) terephthalate copolyester, said adhesive components being compatibly in solution in a volatile organic solvent therefor, said hydroxyl-terminated copolyester (A) being an ester condensation polymer having units from at least one saturated aliphatic diol composed of carbon, hydrogen and oxygen atoms and having one to two primary hydroxyl substituents per molecule and units from a plurality of dicarboxylic components including 25 to 85 mol percent of terephthalic units based on the total moles of dicarboxylic acid units, and being characterized by an inherent viscosity in the range of 0.4 to 1.5 based on the relative viscosity of a solution of 0.6 gram of the copolyester in 100 ml. of m-cresol.

2. An adhesive composition of claim 1 wherein said dicarboxylic units of said copolyester consist essentially of 40 to 90 mol percent of aromatic dicarboxylic units including said terephthalic units, and at least 10 mol percent of units from at least one saturated aliphatic dicarboxylic acid having at least four carbon atoms in the linear chain of atoms linking the carboxyl substituents thereof.

3. An adhesive composition of claim 1 having said adhesive components in the following proportions:

| | Parts |
|---|---|
| (A) Terephthalate copolyester | 100 |
| (B) Diepoxide | 2–70 |
| (C) Pyromellitic dianhydride-adduct | 0.5–10 |

4. An adhesive composition of claim 1 having said adhesive components in the following proportions:

| | Parts |
|---|---|
| (A) Terephthalate copolyester | 100 |
| (B) Diepoxide | 2–70 |
| (D) Polyisocyanate-adduct | 2–25 |

5. An adhesive composition of claim 1 having said adhesive components in the following proportions:

| | Parts |
|---|---|
| (A) Terephthalate Copolyester | 100 |
| (B) Diepoxide | 5–30 |
| (C) Pyromellitic dianhydride-adduct | 1–5 |
| (D) Polyisocyanate-adduct | 5–15 |

6. An adhesive composition of claim 5 wherein said Terephthalate Copolyester (A) is made up of units from ethylene glycol and units from a combination of at least one aromatic dicarboxylic component including terephthalic and at least one saturated aliphatic dicarboxylic component including a $C_{10}$ species.

7. An adhesive composition of claim 6 wherein said units from said combination of aromatic and saturated aliphatic dicarboxylic components consist essentially of units from a quadri-combination of telephthalic, isophthalic, sebacic and adipic components.

8. An adhesive composition of claim 6 wherein said units from said combination of aromatic and saturated aliphatic dicarboxylic components consist essentially of units from a combination of terephthalic, sebacic, 2-ethylsuberic, and 2,5-diethyl adipic components.

9. An adhesive composition of claim 5 wherein said diepoxide is a 3,4-epoxy-cyclohexylmethyl-3,4-epoxy-cyclohexane carboxylate.

10. An adhesive composition of claim 9 wherein said epoxy-substituted carboxylate includes a methyl substituent in the 6-position of each of the cycloaliphatic rings.

11. An adhesive composition of claim 5 wherein said pyromellitic dianhydride-adduct is the condensation product of two moles of pyromellitic dianhydride per mole of a diol.

12. An adhesive composition of claim 5 wherein said PMDA-adduct is the condensation product of two moles of PMDA and one mole of 2,2-bis[4-(2-hydroxyethanoxy)phenyl]propane.

13. An adhesive composition of claim 5 wherein said polyisocyanate-adduct is the condensation product of an aliphatic triol and a toluylene-diisocyanate in proportion such that the ratio of CNO groups is from about 1.33 to about 1.83 per OH substituent.

14. An adhesive composition of claim 5 wherein said polyisocyanate-adduct is the condensation product of about 5 moles of toluylene-diisocyanate and about 2 moles of trimethylolpropane.

15. A laminate consisting essentially of a first layer of a condensation polymer made up of units from terephthalic acid and units from an alpha, omega glycol, a second hydrophobic layer, and an adhesive layer therebetween which is the cured composition of claim 1.

16. A laminate of claim 15 having as said first and second layers a condensation polymer made up of units from terephthalic acid and ethylene glycol.

17. A reflective laminate consisting essentially of a transparent first surface layer of a condensation polymer made up of units from terephthalic acid and units from ethylene glycol, a layer of aluminum foil, an adhesive layer between one surface of said foil and said first layer, a second transparent surface layer of said condensation polymer and an adhesive layer between said second surface layer and a second surface of said metal foil, said adhesive being the cured adhesive composition of claim 5.

18. A reflective laminate consisting essentially of an assembly of a first surface layer of a transparent pellicle of a condensation polymer made up of units from terephthalic acid and units from ethylene glycol, one surface of said pellicle being metallized sufficiently to provide reflectance, a second surface layer of said transparent pellicle having a metallized surface, and an adhesive layer between the metallized surface of said first layer and the metallized surface of said second layer, said adhesive being the cured adhesive composition of claim 5.

References Cited in the file of this patent

UNITED STATES PATENTS

| 2,799,663 | Hampton et al. | July 16, 1957 |
| 2,830,031 | Fisch | Apr. 8, 1958 |
| 2,855,421 | Bunge et al. | Oct. 7, 1958 |
| 2,890,194 | Phillips et al. | June 9, 1959 |
| 2,892,747 | Dye | June 30, 1959 |
| 2,935,488 | Phillips et al. | May 3, 1960 |
| 3,012,904 | Hudson | Dec. 12, 1961 |
| 3,069,746 | Scharf | Dec. 25, 1962 |

OTHER REFERENCES

Pyromellitic Dianhydride, published by E. I. du Pont and Co., 1955 (pp. 8, 9 and 13 cited).

UNITED STATES PATENT OFFICE
CERTIFICATE OF CORRECTION

Patent No. 3,170,833                        February 23, 1965

Paul Randolph Noyes

It is hereby certified that error appears in the above numbered patent requiring correction and that the said Letters Patent should read as corrected below.

Column 3, line 33, for "of more" read -- or more --; column 4, line 23, for "monometric" read -- monomeric --; column 6, line 12, for "-R-" read -- -Y- --; column 15, line 45, for telephthalic" read -- terephthalic --.

Signed and sealed this 20th day of July 1965.

(SEAL)
Attest:

ERNEST W. SWIDER                        EDWARD J. BRENNER
Attesting Officer                            Commissioner of Patents